L. E. GIBSON.
ADJUSTABLE DEVICE FOR UNITING FRAMES.
APPLICATION FILED APR. 12, 1911.

1,077,908.

Patented Nov. 4, 1913.

Witnesses.
Inventor.
Lemuel E. Gibson

UNITED STATES PATENT OFFICE.

LEMUEL E. GIBSON, OF DES MOINES, IOWA.

ADJUSTABLE DEVICE FOR UNITING FRAMES.

1,077,908.  Specification of Letters Patent.  Patented Nov. 4, 1913.

Application filed April 12, 1911. Serial No. 620,675.

*To all whom it may concern:*

Be it known that I, LEMUEL E. GIBSON, a citizen of the United States, and resident of Des Moines, in the county of Polk and State of Iowa, have invented a certain new and useful Adjustable Device for Uniting Frames, of which the following is a specification.

The object of my invention is to provide an adjustable device for uniting frames for pictures in which the glass may be spaced apart from the picture to give a more effective setting to the latter.

A further object is to provide such a device for securing together two complete frame members one of which carries the glass and the other the picture, in such a way that when the two frame members are placed together the glass and the picture will be spaced apart.

A further object is to provide such a device in which the two complete frame members may be readily taken apart or fastened to each other. It is well known that if a picture is placed against a glass, dust and the like is likely to be rubbed or ground into the picture.

Where the picture is secured in the frame by means of tacks or the like engaging a wooden back, the operation of removing the picture and cleaning the glass is clumsy and slow. This difficulty it is the purpose of my invention to obviate.

My invention consists in the construction, arrangement and combination of the various parts of the device, whereby the objects contemplated are attained, as hereinafter more fully set forth, pointed out in my claim, and illustrated in the accompanying drawings in which—

Figure 1:
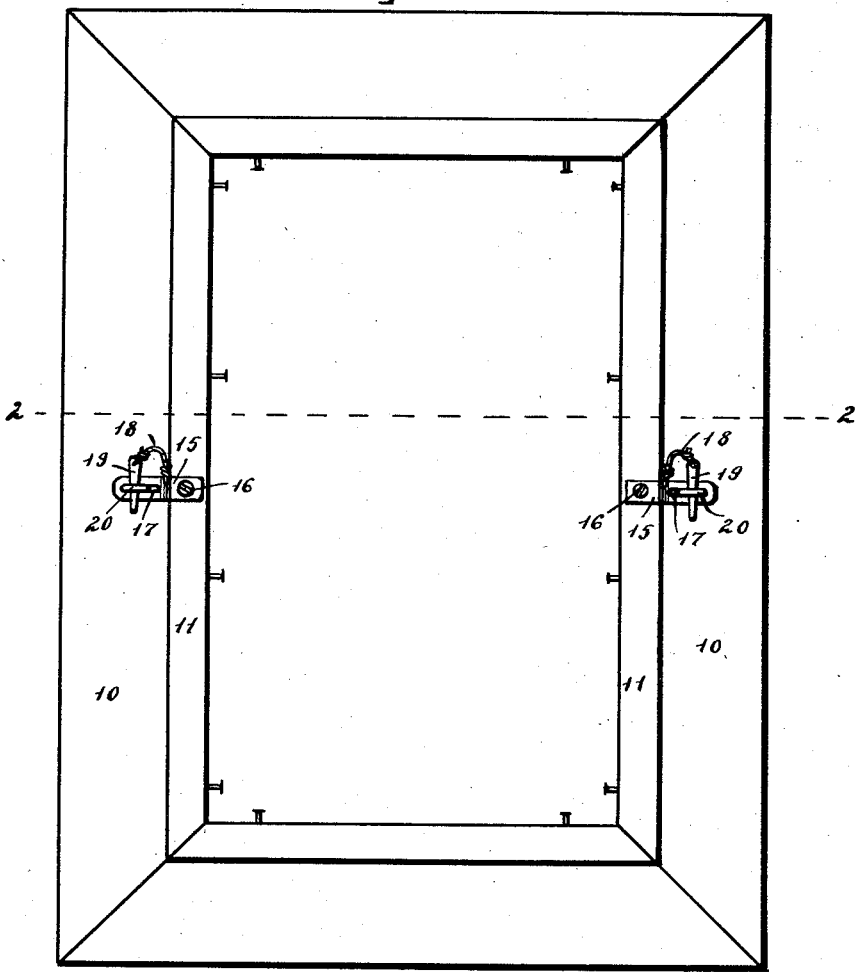
Figure 2:
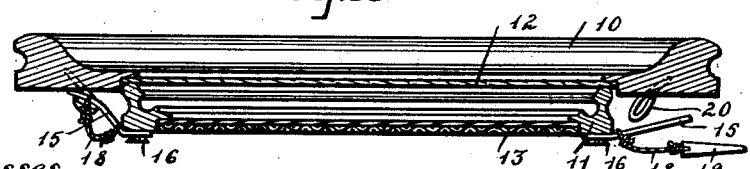

Figure 1 shows a rear view of two picture frames secured together by an adjustable device embodying my invention. Fig. 2 shows a detail, sectional view on the line 2—2 of Fig. 1. Fig. 3 shows a perspective view of parts of the two frames, showing the operation of the fastening device.

My improved adjustable device for uniting frames is designed to secure together two complete frames. The larger or outer frame I have indicated in the accompanying drawings by the reference numeral 10; the smaller or inner frame 11 is designed to fit into the rabbet of the larger frame. The inner edges of the larger frame are grooved on their rear side, and the smaller frame is designed to fit in said grooves or rabbets as shown in Fig. 2. I preferably place a glass 12 in the larger frame against the face of the groove therein. A picture 13 is placed in the smaller frame in any desired manner. It will thus be seen that the picture can be framed in the ordinary way and that the larger frame can then be constructed of the proper size to fit the smaller frame. The larger and smaller frames can be made in regular sizes for framing prints and cuts of pictures made in standard sizes. For detachably securing the smaller frame to the larger frame in such a manner that the frames may be readily and quickly taken apart, I provide on one of the frames a pair of plates 15 secured to the back of the frame near the middle of the sides thereof. The plate 15 is bent to extend from the back of the smaller frame to the back of the larger frame as shown in Fig. 2, and so that one end is secured on one frame and the other may reach to a point against or close to the other frame when the frames are placed together. The plate 15 is preferably secured to the frame 11 by a screw or similar device 16 so that it has slight pivotal movement and is constructed with a slot 17 near its other end designed to receive an eyelet 20 or the like, fastened to the other frame as clearly shown in Fig. 1. Secured to the plate 15 is a wire, cord or small chain 18 which has at its free end a tapered pin 19 preferably flat, designed to be received in the eyelet 20 and to hold the plate 15. The pin 19 is preferably constructed of such size that its lower end will readily enter the staple but with its end which is secured to the wire 18 of such size that it will not go entirely through the staples. I preferably construct the plates 15 of annealed and somewhat resilient metal which can be bent frequently without breaking. Plates so made can be used on all improved frames regardless of the thickness of the frame 11 by varying the location of the screw 16, or eyelet 20, or both. The staple 20 is preferably constructed with an elongated opening and is secured to the frame 10 with said opening extending upwardly and toward the frame 11. When the staples 20 are received in the slots 17 and the pins 19 are inserted in the eyelets above the plates it will be seen that the farther the pin is pushed through the eyelet the tighter the frame 11 is drawn to the frame 10. Thus by the construction and arrangement of the plates 15, the eyelets 20 and the pins 19, and the proper use thereof, the frames 10 and 11 may be adjusted more or less tightly together, as may be desired.

It will be seen that a few sizes of plates may easily be adjusted to fit all ordinary frames regardless of their differences in size, by varying the location of the screws by which the plates are fastened and of the screw eyes. The snugness of the adjustment of the frames may be varied by means of the tapered pins.

In the practical construction of my device, I construct the frame 11 of the proper size to receive the picture desired and then construct the frame 10 of proper size to receive the frame 11. It will be understood that picture frame molding is ordinarily provided with the grooves or rabbets on its rear side for the reception of the glass 12. Such picture molding is cut of the proper length; and in making the frame 10, I make such frame of such size that the rabbets will snugly receive the molding of the frame 11. I secure the plates 15 either to the frame 11 or to the frame 10, preferably to the former, and fasten the eyelets 20 in the proper place on the other frame. I then place the picture in the frame 11 and the glass in the frame 10. The frames may then be put together and the slots 17 and the pins 19 placed in said eyelets. It will be seen that two or any larger number of plates 15 may be used in making one of my frames.

It is well known that it is desirable in framing pictures to have the picture spaced apart from the glass. Where the picture is placed against the glass some dirt is likely to work its way back of the glass and to be rubbed or ground into the picture. This difficulty is wholly avoided by the use of my new and improved frame. Where an inner and outer molding are used it is common practice to place the glass in the inner molding against the picture, and to nail the inner and outer molding together. In such cases it is difficult to take out the glass for purposes of cleaning. Where the inner and outer frames are nailed together instead of being detachably fastened, the glass may be placed between them and thus separated from the picture, but also in that case it is very difficult to take the glass out for cleaning. It is obvious that with my improved frame, the glass may be easily taken out, and cleaned. Where the inner and outer picture frames are nailed together, the glass is likely to be broken. It is difficult to nail them without driving a nail through the molding of the outer frame and spoiling the same. These difficulties are obviated by the use of my device. Where the picture and the glass are placed together any moisture which collects on the inside of the glass is likely to spoil the picture. No such thing can happen when my frame is used.

By the use of the term wire in the following claim, I intend to cover wire, cord, small chains or anything suitable for the purpose.

I claim as my invention:

In combination with frames having unalined surfaces, a device for securing the frames together comprising a pliable metallic plate pivoted upon the surface of one frame to swing in a plane parallel with the said surface and restrained against other pivotal movement with relation to said surface, said plate having a slot in longitudinal alinement with its pivot, an eye rotatably mounted upon the other frame, at the surface thereof which is out of alinement with the surface of the first mentioned frame upon which the plate is mounted, said eye adapted to pass through the slot and a wedge insertible through the eye and adapted to force the slotted end of the plate toward that surface at which the eye is mounted and to a point between and spaced from the two planes, whereby strains are simultaneously established longitudinally of the plate and the eye.

Des Moines, Iowa, April 5, 1911.

LEMUEL E. GIBSON.

Witnesses:
M. WALLACE,
MAYBELLE PETERSON.

---

Copies of this patent may be obtained for five cents each, by addressing the "Commissioner of Patents, Washington, D. C."